United States Patent

[11] 3,580,647

| [72] | Inventor | William R. Richards |
| | | Roseau, Minn. |
| [21] | Appl. No. | 767,641 |
| [22] | Filed | Oct. 15, 1968 |
| [45] | Patented | May 25, 1971 |
| [73] | Assignee | Textron Inc. |
| | | Providence, R.I. |

[54] SNOWMOBILE TRACK
9 Claims, 10 Drawing Figs.

[52] U.S. Cl. .................................................. 305/35,
24/141, 74/231
[51] Int. Cl. ........................................... B62d 55/24
[50] Field of Search........................................ 305/35, 37,
38, 57; 198/193, 184; 74/231, 231 (C), 237;
24/141, 202

[56] References Cited
UNITED STATES PATENTS

| 3,515,443 | 6/1970 | Hallaman | 305/38 |
| 690,854 | 1/1902 | Grant | 24/141UX |
| 1,202,682 | 10/1916 | Diehl | 74/231 |
| 2,025,999 | 12/1935 | Meyers | 305/37 |
| 2,899,242 | 8/1959 | Bombardier | 305/38 |
| 3,107,128 | 10/1963 | Ruane | 305/35(EB) |
| 3,120,409 | 2/1964 | Beall | 305/38X |
| 3,285,677 | 11/1966 | Marier | 305/38 |

FOREIGN PATENTS

| 678,766 | 1/1964 | Canada | 305/34 |

OTHER REFERENCES

Stimpson Co. Catalog No. 86, pages 4 published 1939 Brooklyn NY Copy in class 24/141

Primary Examiner—Richard J. Johnson
Attorney—Merchant and Gould

ABSTRACT: An endless flexible drive belt having longitudinally spaced openings for meshing engagement with the teeth of a drive sprocket wheel, and belt reinforcing and wear elements mounted in the openings. The wear elements have portions that are curved in a direction longitudinally of the belt, the curved portions being formed to closely follow the curvature of the sprocket wheel.

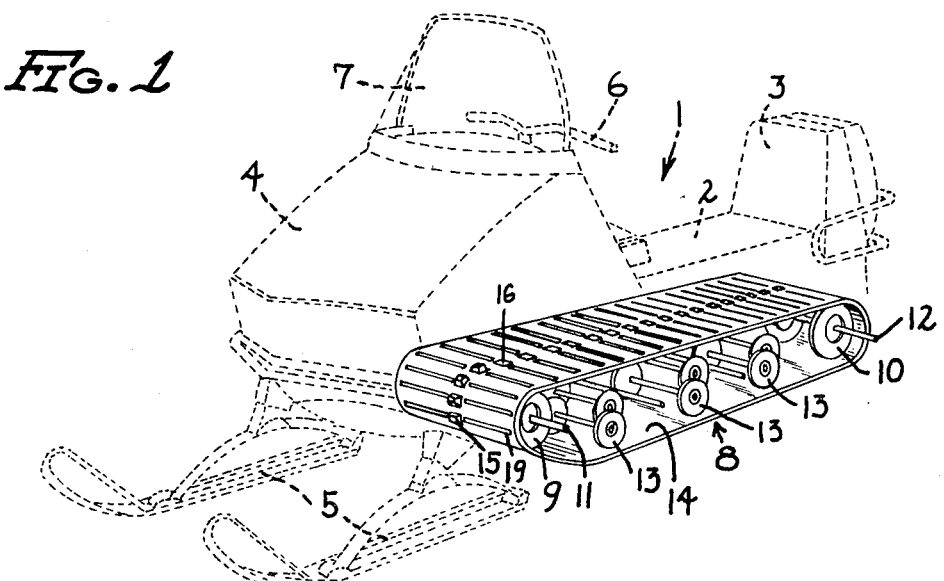
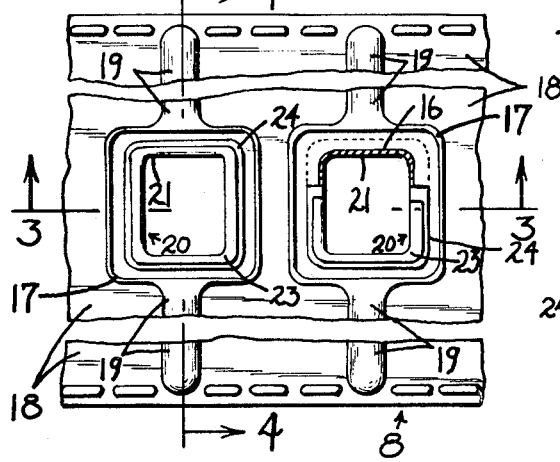
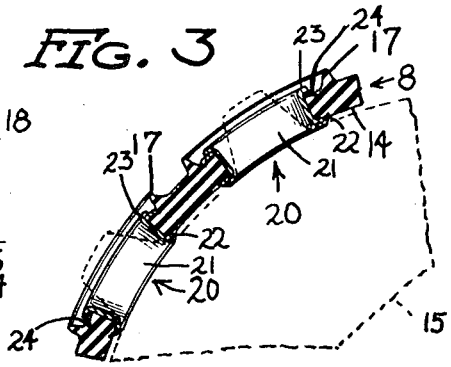
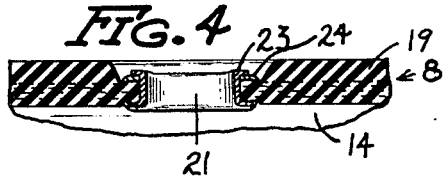
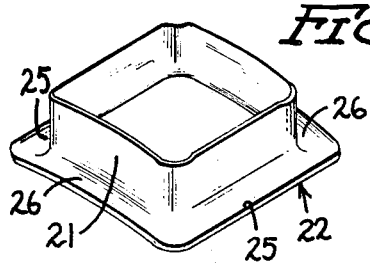
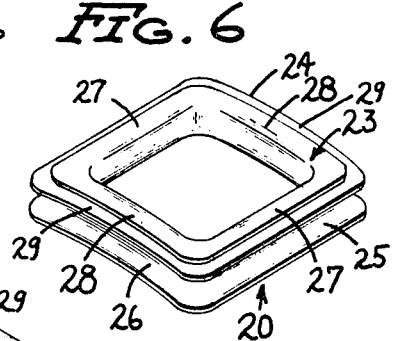
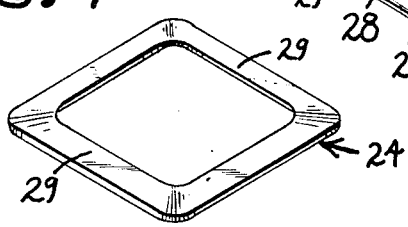
INVENTOR.
WILLIAM R. RICHARDS
BY Merchant & Gould
ATTORNEYS

PATENTED MAY 25 1971

INVENTOR.
William R. Richards
BY
Merchant & Gould
ATTORNEYS

SNOWMOBILE TRACK

The present invention is particularly adapted for use in the driving of vehicles commonly known as snowmobiles, which utilize endless drive tracks entrained over drive gears or sprocket wheels and vehicle supporting bogie wheels, and which are driven at considerable speeds.

Heretofore, drive tracks in the nature of endless rubberlike belts have been used, these having at least one row of longitudinally spaced openings therein for reception of the teeth of one or more drive sprocket wheels. These openings constitute a weakness in the belt, particularly when the belt is subject to hard usage, such as high speed driving and extreme steering conditions which subject the drive track to substantial lateral or transverse strain. Thus, the openings become rapidly enlarged by wear and thrust loads, causing faulty operation and early belt failure. Attempts have been made to reinforce belts of this type by using metal rods, and by thickening the belt material around the openings, as disclosed in the U.S. Letters Pat. to Bombardier, No. 2,899,242. While the metal rods do help to reinforce the openings against substantial deformation longitudinally of the belt, the thickened portions around the openings have not been materially effective in reinforcing the openings against lateral wear.

An important object of this invention is the provision of a belt reinforcing and wear element which may be quickly and easily mounted on a flexible drive belt during or after the manufacture of the belt.

Another object of this invention is the provision of a belt reinforcing and wear element which is highly effective in reducing both longitudinal and transverse wear and deformation of the belt at the portions thereof engaged by a drive sprocket.

Still another important object of this invention is the provision of a belt reinforcing and wear element which materially aids the belt to track over a drive sprocket wheel with a high degree of smoothness at extreme belt speeds.

To the above ends, I provide a plurality of belt reinforcing and wear elements for drive tracks of the endless flexible belt variety, one of said elements for each of the drive sprocket tooth-receiving openings in the belt. Each reinforcing and wear element comprises a tubular sleeve portion snugly received in a respective belt opening, and generally radially outwardly projecting marginal flanges at opposite ends of the sleeve portion, each of the flanges engaging an adjacent surface of the belt around the respective opening. The flanges are generally flat in a direction transversely of the belt and curved in a direction longitudinally of the belt, the curved flange portions having a radius substantially conforming to that of a drive sprocket wheel of predetermined diameter, whereby to curve or bend the belt adjacent the openings thereof, so that the belt rides smoothly on the sprocket wheel, and pulsating or rough running of the belt over the sprocket wheel is eliminated.

DESCRIPTION OF THE DRAWINGS

FIG. 1 is a view in perspective of the drive belt of this invention, shown as being associated with a snowmobile, the snowmobile being shown in dotted lines;

FIG. 2 is an enlarged fragmentary view in top plan of the drive track and belt reinforcing and wear element of this invention, some parts being broken away and some parts being shown in section;

FIG. 3 is a fragmentary section taken substantially on the line 3–3 of Fig. 2, and showing the drive track entrained over a drive sprocket wheel;

FIG. 4 a fragmentary section taken on the line 4–4 of FIG. 2;

FIG. 5 is a view in perspective of the belt reinforcing and wear element of this invention in a partially completed condition;

FIG. 6 is a view in perspective of the reinforcing and wear element removed from the drive belt;

FIG. 7 is a view in perspective of a washer comprising a portion of the wear element;

FIG. 8 is a view corresponding to FIG. 6, but showing a modified arrangement;

and

Figure 9:
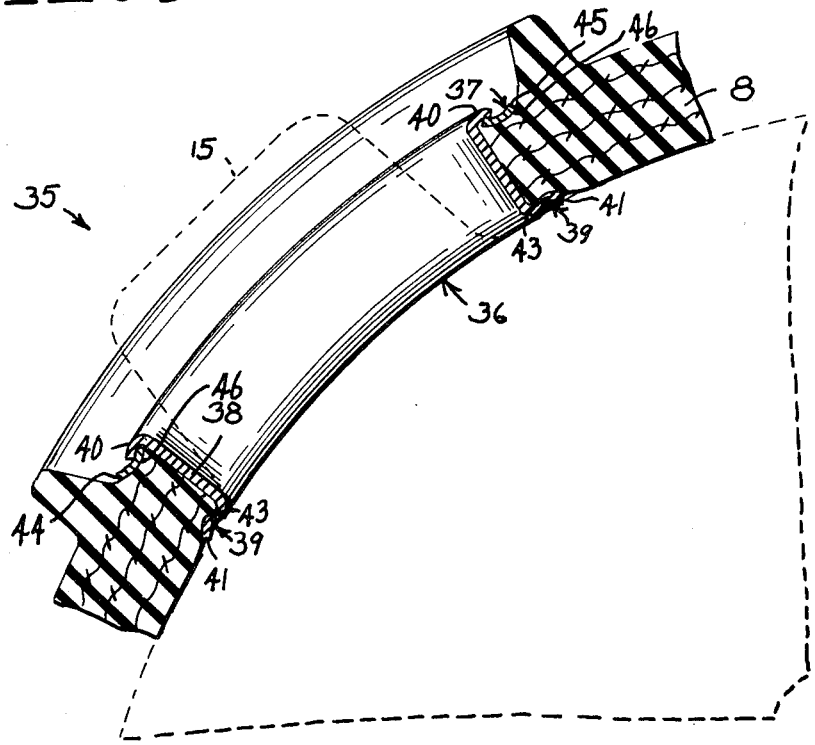
FIG. 9 is an enlarged view corresponding to a portion of FIG. 3, but showing another modified form of the invention.
Figure 10:
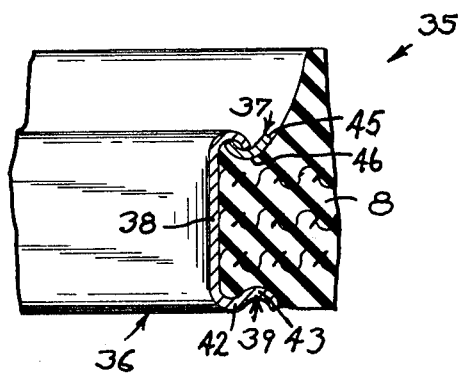

FIG. 10 is a still further enlarged fragmentary section taken on the line 10–10 of FIG. 9.

DETAILED DESCRIPTION

In FIG. 1, a vehicle such as a snowmobile is shown by dotted lines, and indicated generally at 1, the same comprising a main body portion 2 having a seat back 3 at its rear end and a hood 4 at its front end, the hood 4 at least partially enclosing a drive motor, not shown. A pair of dirigible ski elements 5 support the front end of the body 2, and are steered by conventional linkage including a steering bar 6. A windshield is shown at 7.

The drive track of this invention comprises an endless flexible belt 8 that is entrained over sets of front and rear wheels 9 and 10 respectively, one each of which is shown in FIG. 1. The front wheels 9 are mounted on a drive shaft 11 that may be assumed to be operatively connected to the drive motor within the hood 4, the wheels or rollers 10 being journaled on an idler shaft 12 suitably mounted in the body 2. The body 2 is supported rearwardly of the skis 5 by a plurality of bogie wheels 13 that engage the inner surface 14 of the lower flight of the drive track or belt 8 and which are suitably mounted on the body 2 in the conventional and well-known manner. In the embodiment of the invention illustrated, the drive track or belt 8 is driven by one or more drive sprocket wheels 15 keyed or otherwise rigidly mounted on the shaft 11, one sprocket wheel being shown in FIG. 1 and fragmentarily shown by dotted lines in FIG. 3.

The drive track or belt 8 is preferably made of fabric reinforced rubber and is formed intermediate its opposite side edges to provide one or more rows of longitudinally spaced generally rectangular openings 16 for reception of the teeth of the sprocket wheel or wheels 15, one row of openings being shown, each of the openings 16 being surrounded by a tread-forming ridge 17 projecting outwardly from the ground-engaging outer surface 18 of the belt 8. Tread-forming ribs 19 extend laterally outwardly from the ridges 17 toward opposite side edges of the drive track or belt 8 as shown in FIGS. 1 and 2, to provide driving traction. Preferably, additional tread-forming or traction elements are utilized intermediate the ribs 19. However, these traction elements do not comprise the instant invention and hence, are not shown.

For the purpose of reinforcing the drive belt 8 at the openings 16, I provide a plurality of grommetlike reinforcing and wear elements 20, one for each of the openings 16. Each of the elements 20 comprises a tubular sleeve portion 21 of a shape and size to snugly fit an opening 16, an inner marginal flange 22 that projects generally radially outwardly from one end of the sleeve portion 21 and which engages the inner surface 14 of the belt 8, and an outer marginal clamping flange 23 which overlies the outer surface 18 of the drive track or belt 8 around the opening 16. A clamping washer 24 underlies the clamping flange 23 and is anchored in clamping engagement with the outer belt surface 18 by the clamping flange 23. As shown in FIGS. 2 and 3, the washer 24 and clamping flange 23 are disposed within the area defined by an adjacent ridge element 17.

A feature of this invention resides in the configuration of the inner marginal flange 22, as well as the clamping flange 23 and washer 24. As shown in FIG. 5, the flange 22 is initially formed to provide end flange portions 25 that are adapted to extend transversely of the drive track or belt 8 and which, while they are cross-sectionally curved, are flat along their longitudinal dimension or in a direction transversely of the drive belt 8. The marginal flange 22 further includes side flange portions 26 that are longitudinally curved in a direction longitudinally of the drive track or belt 8, the radius of curvature of the flange portions 26 conforming substantially to the root radius of the drive sprocket wheel 15. The end and side portions 27 and 28 of the clamping flange 23 are shaped similarly to the flanges 25 and 26 respectively, the end flanges 27 being substantially flat in the direction transversely of the drive belt 8 and the side portions 28 being curved in a direction longitudinally of the belt 8. The clamping washer element 24 may be initially produced in a flat condition as shown in FIG. 7, or if desired, may be formed to have its opposite side portions 29 curved in the manner of the flange side portions 26 and 28, and cross-sectionally curved in the same manner as the end and side flange portions 25 and 26 respectively. In assembly and mounting of the wear elements 20 on the drive track or belt 8, the washers 24 become bent to conform to the curvature of the flange side portions 26 and 28. Preferably, the opposite side portions 29, as well as their interconnecting portions, are cross-sectionally curved in the same manner as the flange portions 25 and 26.

The reinforcing and wear elements 20 being made of metal, such as stainless steel, are very rigid, and do not flex during operation of the drive belt 8. The material of the drive track or belt 8 between the openings 16 is quite flexible, and easily conforms to the circular shape of the sprocket wheel 15. Inasmuch as the side flanges of each wear element 20 are longitudinally curved, as above described, the drive track or belt 8 readily conforms to the circular shape of the sprocket wheel 15 as the drive belt 8 moves thereover, thereby insuring extremely quiet and smooth running of the drive belt 8 over the sprocket wheel 15. As shown in FIG. 3, the drive belt 8 forms a smooth continuous arc as it is entrained over the sprocket wheel 15.

Prior to assembly with the drive track or belt 8, each reinforcing and wear element 20 is die stamped or drawn to the shape shown in FIG. 5, prior to forming of the clamping flange 23. Each sleeve portion 21 is then inserted in a respective one of the openings 16, with the marginal flange 22 engaging the inner surface 14 of the belt 8. A washer 24 is then set around the outer end portion of the sleeve portion 21 in engagement with the outer surface 18 of the belt 8, after which the clamping flange 23 is die formed over the washer 24 to securely anchor the assembled element in place. It will be noted that the ridge elements 17 project outwardly from the outer surface 18 beyond the flanges 23, whereby to prevent the metallic flanges 23 from coming into contact with dry ground or pavement when the vehicle traverses such dry areas. Although not specifically shown, a second sprocket wheel is mounted on the shaft 12 to maintain alignment of the drive track or belt 8 with the vehicle 1.

Due to the cross-sectional curvature of the flange portions 25 and 26, as well as that of the corresponding portions of the washer 24, the outer marginal edges of the flange 22 and washer 24 are squeezed into the resilient material of the drive track about the periphery of each opening 16 therethrough, as shown in FIGS. 3 and 4. Thus, each reinforcing and wear element 20 is securely locked about its entire periphery to the drive track 8. This arrangement not only prevents elongation of the openings 16 in directions longitudinally and transversely of the belt or track 8, but also aids in maintaining a constant distance or pitch dimension between the openings 16 in the row thereof. Driving load, applied by a tooth of the sprocket wheel 15 against a leading end portion of the element 20 engaged thereby, is transferred by the side portions thereof to the trailing end portion thereof. The end flange 35 and overlying portion of the washer 4, at the trailing end of the element 20, exert a positive pull on the following portion of the drive track clamped therebetween, so that constant spacing between adjacent reinforcing and wear elements 20 in the row thereof, is maintained. In like manner, side thrust load against either side of a reinforcing and wear element 20 is transferred to the opposite side thereof wherein the side flange 26 and overlying portion of the washer 24 exert lateral pull on the portion of the track 20 gripped thereby.

The modified form of belt reinforcing and wear element illustrated in FIG. 8 and indicated generally at 30, is similar in most respects to the element 20 of FIG. 6, the same comprising a tubular sleeve portion 31, a marginal flange 32 identical to the marginal flange 22, and a clamping flange 33 similar to the clamping flange 23. In this form of reinforcing and wear element, the washer 24 is not used, and the clamping flange 33 is formed in assembly with the belt to directly engage the outer surface 18 of the belt 8 around the opening 16.

The modified form of reinforcing and wear element illustrated in FIGS. 9 and 10 and indicated generally at 35, is generally similar to that shown in FIGS. 2—7, and includes a grommetlike member 36 and a clamping washer 37. The member 36 is formed to provide a generally rectangular sleeve portion 38, an inner marginal flange 39, and an outer marginal clamping flange 40. The inner flange 39 has end flange portions 41 that extend transversely of the drive track 8, and side flange portions 42 that extending longitudinally of the drive track 8, only one of the side flange portions being shown, see FIG. 9. As shown, the inner flange 39 is cross-sectionally S-shaped to provide a rounded peripheral rib portion 43 projecting toward the opposite clamping flange 40. The clamping washer 37 is generally similar to the washer 34, having end portions 44 and side portions 45, only one of the side portions being shown, see FIG. 10. Each of the portions 44 and 45 is cross-sectionally arcuate, presenting a convex surface 46 to the adjacent surface portion of the drive track 8, whereby, when the members 36 and 37 are applied to the track 8, and the clamping flange 40 is formed, the portion of the track 8 adjacent the respective opening 16 is compressed between the convex surfaces 46 of the washer portions 44 and 45 and the rounded peripheral rib 43. This arrangement prevents the marginal edges of the washer 37 and flange 39 from cutting into the rubber and fabric of the drive track 8 while maintaining a secure grip thereon.

It will be appreciated that, with the several forms of the invention illustrated and above described, not only is smooth and efficient operation at all running speeds of the vehicle obtained, but enlargement of the openings 16 both longitudinally and transversely of the belt, is virtually eliminated, thus materially lengthening the effective life of the drive belt.

I claim:

1. A vehicle track, comprising:
   an endless, flexible belt having an inner surface, a ground engaging outer surface and a plurality of longitudinally spaced openings therethrough for reception of the teeth of a power driven sprocket wheel;
   a reinforcing and wear element for each of said openings, the elements each comprising a flange portion overlying the margins of the associated opening on the inner and outer surfaces of the flexible belt, the flange portions being connected by a sleeve extending through the opening and the flange portions being curved in a direction longitudinally of the belt and having a radius of curvature generally conforming to that of the drive sprocket wheel.

2. A vehicle track comprising; an endless flexible rubberlike belt having an inner surface, a ground-engaging outer surface, a plurality of longitudinally spaced openings therethrough for reception of the teeth of a power driven sprocket wheel, and a plurality of reinforcing and wear elements each disposed in a different one of said openings; each of said reinforcing and wear elements comprising a tubular sleeve portion coaxial with its respective one of said openings and snugly fitted therein, and flange means projecting generally radially outwardly from each of said tubular sleeve portions and anchored to said belt, said flange means including flange portions projecting transversely from opposite sides of each of said sleeve portions toward the adjacent longitudinal edges of the belt, said flange portions being curved in a direction longitudinally of the belt and having a radius of curvature generally conforming to that of a sprocket wheel of predetermined diameter.

3. The vehicle drive track defined in claim 2 in which said sleeve portions are each cross-sectionally generally rectangular to define a generally rectangular sprocket tooth-receiving opening, said flange means including other flange portions projecting from opposite sides of each of said sleeve portions in directions longitudinally of the belt, said other flange portions being substantially flat in a direction transversely of the belt.

4. The vehicle drive track defined in claim 3 in which the flange means of each of said reinforcing and wear elements projects generally outwardly from one end of its respective tubular sleeve portion, each of said flange means extending continuously around its respective tubular sleeve portion.

5. A vehicle drive track comprising; an endless flexible rubberlike belt having an inner surface, a ground-engaging outer surface, a plurality of longitudinally spaced openings therethrough for reception of the teeth of a power operated sprocket wheel, and reinforcing and wear elements for each of said openings; said reinforcing and wear elements including tubular sleeve portions each coaxial with a different one of said openings and snugly fitted therein, said reinforcing and wear elements having generally radially outwardly projecting axially inner and outer marginal flanges at inner and outer ends respectively of said sleeve portions, said inner and outer marginal flanges operatively engaging said inner and outer surfaces respectively of said belt around each of said openings and tightly gripping the belt therebetween around said openings, said marginal flanges having longitudinally flat portions extending transversely of the belt and longitudinally curved portions extending longitudinally of the belt, said longitudinally curved flange portions having a radius substantially conforming to that of a drive sprocket wheel of predetermined diameter.

6. The vehicle drive track defined in claim 5 characterized by washer elements encompassing said sleeve portions and each interposed between one of said marginal flanges and the adjacent surface of said belt, said washer elements being longitudinally substantially flat in a direction transversely of the belt and longitudinally curved in a direction longitudinally of the belt whereby to follow the curvature of said curved flanged portions.

7. A vehicle drive track comprising; an endless flexible rubberlike belt having an inner surface, a ground-engaging outer surface, a plurality of longitudinally spaced openings therethrough for reception of the teeth of a power operated sprocket wheel, and reinforcing and wear elements in each of said openings; said reinforcing and wear elements including tubular sleeve portions each coaxial with a different one of said openings and snugly fitted therein, said reinforcing and wear elements having generally radially outwardly projecting axially inner and outer marginal flanges at inner and outer ends respectively of said sleeve portions, said inner and outer marginal flanges operatively engaging said inner and outer surfaces respectively of said belt around each of said openings and tightly gripping the belt therebetween around said openings, said belt having a plurality of ground-engaging ridge elements each encompassing the outer marginal flange of a different one of said reinforcing and wear elements, said ridge elements projecting outwardly from the outer surface of the belt beyond said outer marginal flanges, whereby to maintain said outer marginal flanges in spaced relationship to the ground.

8. The vehicle drive track defined in claim 7, in further combination with a plurality of washer elements each encompassing a different one of said sleeve portions, said washer elements being interposed between said outer marginal flanges and the adjacent outer surface of the belt and clamped to said belt by said outer marginal flanges.

9. A vehicle drive track comprising; an endless flexible rubberlike belt having an inner surface, a plurality of longitudinally spaced openings therethrough for reception of the teeth of a power operated sprocket wheel, and reinforcing and wear elements in each of said openings; said reinforcing and wear elements including tubular sleeve portions each coaxial with a different one of said openings and snugly fitted therein, said reinforcing and wear elements having generally radially outwardly projecting axially inner and outer marginal flanges at inner and outer ends respectively of said sleeve portions; and washer elements encompassing said sleeve portions adjacent said outer marginal flanges, said washer elements having cross-sectionally arcuate side and end portions providing convex surfaces facing said inner marginal flanges, said inner marginal flanges each having side and end flange portions underlying the side and end portions respectfully of their respective washers and defining rounded ribs facing the convex surface of said respective washers, said track being compressed about said openings between the convex washer surfaces and said ribs of each of said reinforcing and wear elements, said washer end portions and adjacent portions of said flanges being straight in a direction transversely of said belt, said washer side portions and portions of said flanges adjacent said washer side portions being curved in a direction longitudinally of said belt, said longitudinally curved washer and flange portions having a radius substantially conforming to that of a drive sprocket wheel of predetermined diameter.